United States Patent
Rakhmailov

(10) Patent No.: US 6,363,708 B1
(45) Date of Patent: Apr. 2, 2002

(54) GAS TURBINE ENGINE

(75) Inventor: Anatoly Rakhmailov, Bataysk (RU)

(73) Assignee: ALM Development, Inc., Washington, DC (US)

( * ) Notice: Subject to any disclaimer, the term of this patent is extended or adjusted under 35 U.S.C. 154(b) by 0 days.

(21) Appl. No.: 09/632,734

(22) Filed: Aug. 4, 2000

Related U.S. Application Data
(60) Provisional application No. 60/159,065, filed on Oct. 12, 1999.

(51) Int. Cl.[7] ............................ F02C 3/34; F02C 3/10; F02C 3/067; F02C 9/50
(52) U.S. Cl. .................... 60/39.03; 60/39.27; 60/39.41; 60/39.162; 60/39.511
(58) Field of Search ............................ 60/39.02, 39.03, 60/39.04, 39.41, 39.162, 39.511, 726, 39.27

(56) References Cited

U.S. PATENT DOCUMENTS

| | | | |
|---|---|---|---|
| 1,388,707 A | | 8/1921 | Heinze |
| 1,732,234 A | | 10/1929 | Jensky |
| 1,868,143 A | | 7/1932 | Heinz |
| 2,303,381 A | | 12/1942 | New |
| 2,410,259 A | | 10/1946 | Birmann |
| 2,441,751 A | | 5/1948 | Broggi |
| 2,469,678 A | * | 5/1949 | Wyman ............ 60/39.41 |
| 2,579,049 A | | 12/1951 | Price |
| 2,715,011 A | | 8/1955 | Schorner |
| 2,784,551 A | | 3/1957 | Karlby et al. |
| 2,821,067 A | | 1/1958 | Hill |

(List continued on next page.)

FOREIGN PATENT DOCUMENTS

| | | |
|---|---|---|
| CH | 246353 | 12/1946 |
| DE | 2332698 | 1/1974 |
| DE | 2335594 | 8/1974 |
| DE | 2437990 | 2/1976 |
| DE | 3713923 | 11/1987 |
| DE | 3835932 | 4/1990 |
| DE | 2018641 | 10/1991 |
| DE | 4331779 | 3/1995 |
| EP | 0103370 | 3/1984 |
| FR | 1163559 | 9/1958 |
| FR | 1166419 | 11/1958 |
| FR | 2385899 | 10/1998 |
| GB | 196452 | 4/1923 |
| GB | 412970 | 7/1934 |
| GB | 413697 | 7/1934 |
| GB | 580447 | 9/1946 |
| GB | 720436 | 12/1954 |
| GB | 753652 | 7/1956 |
| GB | 801281 | 9/1958 |
| GB | 803994 | 11/1958 |
| GB | 1435687 | 5/1976 |
| JP | 11159345 | 6/1999 |
| RU | 1774290 | 6/1992 |
| RU | 2050455 | 12/1995 |
| RU | 2052145 | 1/1996 |
| WO | WO 9505063 | 2/1995 |
| WO | WO 99/63210 | 12/1999 |

*Primary Examiner*—Ted Kim
(74) *Attorney, Agent, or Firm*—Hughes Hubbard & Reed LLP; Ronald Abramson; Peter A. Sullivan

(57) ABSTRACT

A method of operating a gas turbine engine having a compressor, a combustor between a waste fluid compressor and a power turbine, a counter-rotating compressor turbine installed downstream of the power turbine, and a heat exchanger having two circuits, in which a heated fluid is prepared by burning fuel with combustion air in a mixture with a waste fluid obtained downstream of a compressor turbine that which is cooled, compressed and heated before mixing with combustion air while keeping the temperature of the waste fluid downstream of the compressor turbine constant and removing a partial flow of the waste fluid into the atmosphere before heating the waste fluid prior to supplying the waste fluid for mixing with the combustion air.

22 Claims, 2 Drawing Sheets

U.S. PATENT DOCUMENTS

| | | | |
|---|---|---|---|
| 2,823,520 A | | 2/1958 | Spalding |
| 2,986,882 A | | 6/1961 | Pavlecka |
| 3,034,298 A | | 5/1962 | White |
| 3,209,536 A | | 10/1965 | Howes et al. |
| 3,280,555 A | | 10/1966 | Charpentier et al. |
| 3,287,904 A | | 11/1966 | Warren et al. |
| 3,369,361 A | * | 2/1968 | Craig .................. 60/39.41 |
| 3,469,396 A | | 9/1969 | Onishi et al. |
| 3,625,003 A | | 12/1971 | Liddle et al. |
| 3,703,808 A | | 11/1972 | Stearns |
| 3,727,401 A | | 4/1973 | Fincher |
| 3,751,911 A | | 8/1973 | Tartaglia |
| 3,775,974 A | | 12/1973 | Silver |
| 3,785,145 A | | 1/1974 | Amann |
| 3,826,084 A | | 7/1974 | Branstrom et al. |
| 3,883,263 A | | 5/1975 | Mai |
| 3,886,732 A | | 6/1975 | Gamell |
| 3,971,209 A | | 7/1976 | de Chair |
| 4,003,199 A | | 1/1977 | Bell, III et al. |
| 4,020,809 A | | 5/1977 | Kern et al. |
| 4,022,544 A | | 5/1977 | Garkusa |
| 4,024,705 A | | 5/1977 | Hedrick |
| 4,084,922 A | | 4/1978 | Glenn |
| 4,142,836 A | | 3/1979 | Glenn |
| 4,149,503 A | | 4/1979 | Ozaki et al. |
| 4,193,568 A | | 3/1980 | Heuvel |
| 4,204,401 A | | 5/1980 | Earnest |
| 4,213,297 A | | 7/1980 | Foster et al. |
| 4,224,912 A | | 9/1980 | Tanaka |
| 4,277,938 A | | 7/1981 | Belke et al. |
| 4,311,431 A | | 1/1982 | Barbeau |
| 4,338,780 A | | 7/1982 | Sakamoto et al. |
| 4,338,781 A | | 7/1982 | Belke et al. |
| 4,370,094 A | | 1/1983 | Ambrosch et al. |
| 4,501,053 A | | 2/1985 | Craig et al. |
| 4,502,277 A | * | 3/1985 | Papastavros ............... 60/39.41 |
| 4,522,557 A | | 6/1985 | Bouiller et al. |
| 4,549,402 A | | 10/1985 | Saintsbury et al. |
| 4,641,495 A | * | 2/1987 | Mowill ................. 60/726 |
| 4,790,133 A | | 12/1988 | Stuart |
| 4,791,784 A | | 12/1988 | Minardi et al. |
| 4,817,858 A | | 4/1989 | Verpoort |
| 4,991,391 A | | 2/1991 | Kosinski |
| 5,054,279 A | | 10/1991 | Hines |
| 5,123,242 A | | 6/1992 | Miller |
| 5,148,670 A | * | 9/1992 | Birch et al. ............... 60/39.41 |
| 5,201,796 A | | 4/1993 | Glinski et al. |
| 5,232,335 A | | 8/1993 | Narayana et al. |
| 5,269,133 A | | 12/1993 | Wallace |
| 5,473,881 A | | 12/1995 | Kramnik et al. |
| 5,762,156 A | | 6/1998 | Bates et al. |
| 5,794,431 A | | 8/1998 | Utamura et al. |
| 6,145,296 A | * | 11/2000 | Rakhmailov ............. 60/39.162 |
| 6,212,871 B1 | * | 4/2001 | Rakhmailov ............. 60/39.162 |

* cited by examiner

GAS TURBINE ENGINE

This application claims benefit of priority based on U.S. provisional patent application No. 60/159,065, filed on Oct. 12, 1999. This application cross-references nine co-pending U.S. patent applications Ser. Nos. 09/161,104, 09/161,114, 09/161,115 and now U.S. Pat. No. 6,305,157, 09/161,170 now U.S Pat. No. 6,145,295, all of which were filed on Sept. 25, 1998, and Ser. Nos. 09/267,893, 09/267,894, 09/267,895, 09/267,896 and 09/267,897 all of which were filed on Mar. 11, 1999, and also four co-pending U.S. provisional patent applications Ser. Nos. 60/159,066, 60/158,934, 60/158,929, and 60/158,935, all of which were filed on Oct. 12, 1999. Each of the above is incorporated by reference herein.

The invention relates to the field of gas turbine engines, and more specifically, to gas turbines maintaining fluid density control to control system operation and minimize losses.

BACKGROUND OF THE INVENTION

In conventional gas turbine engines having a turbine and a compressor, turbine output power is controlled by simply varying the fuel supply. When fuel supply is increased, the temperature upstream of the turbine increases, resulting in increased power and speed. This also causes an increase in pressure and in the expansion ratio. Controlling power in conventional gas turbine engines in this way does not pose any significant problems, but these engines are unable to accommodate sudden load changes because the temperature in the gas turbine engine changes over a very wide range: from 600° K. to 1,400° K. when operating from idling conditions to full load. In addition, it is not possible to "scale down" a conventional gas turbine engine to obtain a lower-power, compact engine for uses such as land vehicle applications because the turbine flow duct fluid parameters would require turbine blades to be as small as ⅛ of an inch in height. With such small blades, the engine would not produce enough torque without requiring a gearbox, which would lower overall efficiency.

These disadvantages can be partly eliminated by reducing the pressure downstream of the turbine with an exhauster. The exhauster allows the expansion ratio to be increased and the pressure upstream of the turbine to be decreased. Turbine blades can then be made larger and consequently produce more torque than otherwise would have been possible. Adding an exhauster does not completely solve the problem, however, because turbine flow duct temperature fluctuations remain. Wide temperature fluctuations cause engine components to incur large thermal expansions and contractions. These deformations result in metal-to-metal clearance fluctuations (which give rise to losses), lower reliability, and reduced service life.

Our co-pending application Ser. No. 09/161,114, filed Sep. 25, 1998 addresses a way to prevent these temperature fluctuations. It discloses a gas turbine engine having a compressor, a power turbine mounted downstream of the compressor, and a compressor turbine for powering the compressor. The compressor turbine is mounted downstream of the power turbine and rotates in a direction opposite to the rotation direction of the power turbine. A heated fluid source is provided upstream of the power turbine and is connected to a fuel source. The engine has a heat exchanger for cooling the waste fluid after the compressor turbine before compressing this waste fluid in the compressor and for heating the waste fluid after the compressor but before feeding this compressed waste fluid to the heated fluid source. To control gas turbine engine power, the fluid density in the engine flow duct is controlled by removing a part of the compressed heated waste fluid leaving the heat exchanger before the compressed waste fluid is fed to the combustor. The removed part of the compressed heated waste fluid is replaced with air for combustion which is fed to the heated fluid source. A pressure booster (compressor) and an auxiliary turbine are used to remove the waste fluid and to replace it with air for combustion.

This approach controls the fluid density in the engine flow duct, thus controlling engine power. The main problem with this density control method is energy loss when the waste fluid is partly removed from the flow duct. In the prior art, the compressed waste fluid is heated in the heat exchanger before a part of the waste fluid is removed from the flow duct of the gas turbine engine. This means that a part of the heat exchanger capacity is used for heating that part of the waste fluid which will then be removed and released into the atmosphere. When this happens, the energy that was used for heating the removed part of the waste fluid is wasted.

Another disadvantage of the prior art is that while the waste fluid-to-air ratio remains stable in the power turbine power range of 50 to 100% when the engine speed remains stable, when the load decreases below 50%, the waste fluid-to-air ratio in the gas mixture going to the combustor changes, with the level of waste fluid becoming higher than needed. As the load decreases, the amount of waste fluid excess increases, especially if the power turbine speed decreases. When the engine goes to the no-load mode, the waste fluid excess can cause flame blowoff. This disadvantage becomes more pronounced when the power turbine speed drops below a certain limit because the fluid velocity leaving the power turbine increases, the losses go up, and the waste fluid outlet temperature of the compressor turbine tends to increase. If the compressor turbine outlet temperature is kept constant by increasing the speed of the compressor, the compressor will produce more waste fluid that will go to the heated fluid source, even as the flow of air fed to the heated fluid source remains the same. This means that the waste fluid excess fed to the heated fluid source will increase, which results in flame blowoff in the heated fluid source. The prior art gas turbine engine consequently cannot work in a stable manner over the entire power range.

It is thus an object of the invention to provide a method of operating a gas turbine engine and a gas turbine engine having a greater efficiency.

Another object of the invention is to provide a method of operating a gas turbine engine in a stable manner over the full power range.

A further object of the invention is to provide a method of operating a gas turbine engine that features a full-range power control system that is simple and effective.

SUMMARY OF THE INVENTION

The above objects are accomplished by providing a method of operating a gas turbine engine in which a heated fluid is prepared by burning fuel and combustion air in a mixture with a waste fluid obtained downstream of the compressor turbine, the waste fluid being cooled, compressed and heated before mixing with the fluid and combustion air. The temperature of the waste fluid downstream of the compressor turbine is kept constant. A partial flow of the waste fluid is removed and released into the atmosphere before heating the waste fluid prior to mixing with combustion air.

The gas turbine engine has a fluid compressor, a combustor between the compressor and a power turbine, a counter-rotating compressor turbine installed downstream of the power turbine, and a heat exchanger which has two circuits. One heat exchanger circuit is inserted between the compressor turbine outlet and the inlet compressor, and other circuit is inserted between the compressor turbine outlet and a mixer that has an outlet connected to the combustor and an inlet connected to an air source. The engine has a device to control waste fluid temperature downstream of the compressor turbine, two flow controls to control the mixer inlets, and an outlet that is used to remove waste fluid and release it into the atmosphere between the compressor inlet and outlet.

Other objects and advantages of the invention will become apparent from the following description of preferred embodiments thereof with reference to the accompanying drawings, in which:

DETAILED DESCRIPTION OF THE DRAWINGS

Figure 1:
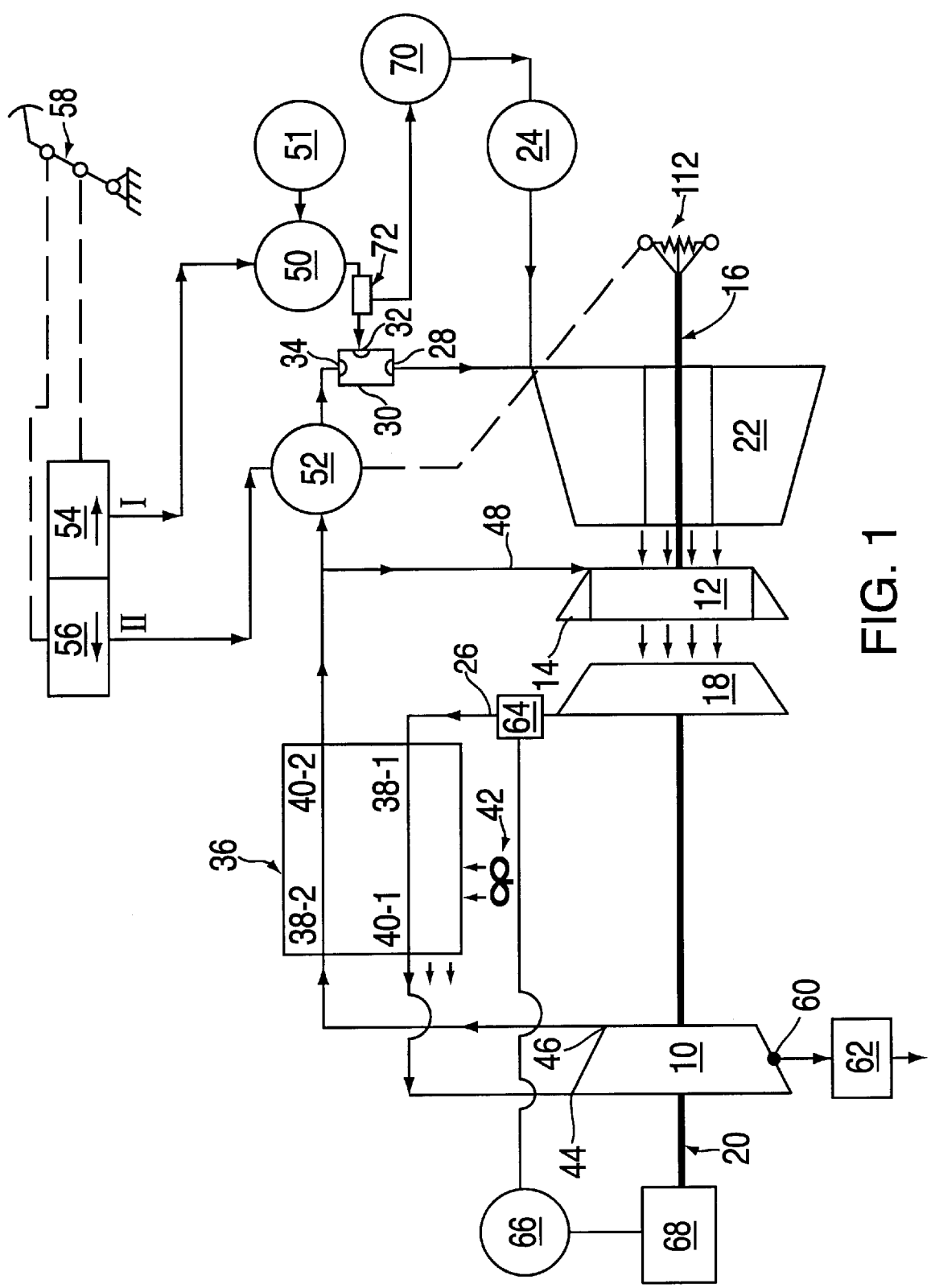
FIG. 1 is a diagrammatic view of a gas turbine engine embodying the principle of the present invention.

A gas turbine engine according to the invention (FIG. 1) has a fluid compressor 10 and a power turbine 12 having blades 14. Power turbine 12 is installed on a shaft 16. A fluid compressor turbine 18 is used to power compressor 10 and is installed on a shaft 20 downstream of power turbine 12. Fluid compressor turbine 18 rotates in the direction opposite to the direction of rotation of power turbine 12. Such turbines are known to those skilled in the art as counter-rotating turbines. A combustor 22 is provided upstream of power turbine 12. The function of combustor 22 is to provide a heated fluid. Fuel is fed to combustor 22 from a fuel source 24, thus producing heated fluid. The heated fluid impinges the blades 14 of power turbine 12, and power turbine 12 thereby generates mechanical energy. The heated fluid then enters compressor turbine 18, which powers compressor 10. Compressor turbine 18 has an outlet 26 that is used to discharge a waste fluid from compressor turbine 18. Combustor 22 is connected to an outlet 28 of a mixer 30, which is designed to mix waste fluid and combustion air and to feed this mixture to combustor 22. Mixer 30 has a first inlet 32 and a second inlet 34.

A heat exchanger 36 has at least two inlets, a first inlet 38-1 and a second inlet 38-2, and at least two outlets, a first outlet 40-1 and a second outlet 40-2. First inlet 38-1 and first outlet 40-1 define a first circuit of heat exchanger 36, and second inlet 38-2 and second inlet 40-2 define a second circuit of heat exchanger 36. A fan generally shown at 42 provides additional cooling of the core of heat exchanger 36. Although heat exchanger 36 is shown as an assembly having two inlets and two outlets that define two circuits, it is understood that it may have more independent circuits that provide a necessary configuration to assure the heat exchange needs of various gas turbine engine subsystems. The construction of the heat exchanger does not have a material bearing on this invention.

Compressor 10 has an inlet 44 and an outlet 46. Inlet 44 of compressor 10 is connected to first outlet 40-1 of heat exchanger 36, and first inlet 38-1 of heat exchanger 36 is connected to outlet 26 of compressor turbine 18. As a result, the waste fluid flow from outlet 26 of compressor turbine 18 passes through heat exchanger 36 and enters inlet 44 of compressor 10 through outlet 40-1 of heat exchanger 36, where it is compressed. The compressed waste fluid flow that leaves compressor 10 through outlet 46 passes through heat exchanger 36 to second outlet 40-2 and cools the waste fluid flow that passes through heat exchanger 36 from inlet 38-1 to outlet 40-1, where it is compressed. The heat taken from the waste fluid flow that exits outlet 26 of compressor turbine 18 is used to heat the compressed waste fluid flow that exits compressor 10 to outlet 40-2. A part of the heated compressed fluid flow from the outlet 40-2 may be diverted to cool blades 14 and other components of power turbine 12. This cooling arrangement is not described in detail here because it does not have material bearing on the present invention. A power turbine cooling system in a gas turbine engine of this type is disclosed in the co-pending application Ser. No. 09/161,115, filed Sep. 25, 1998.

A first flow control 50 is connected to a first inlet 32 of mixer 30 and is used to meter combustion air entering the mixer. First flow control 50 can communicate directly with the atmosphere, or it can receive combustion air from a source of air under pressure 51. A second flow control 52 inserted between second outlet 40-2 of heat exchanger 36 and second inlet 34 of mixer 30 meters the heated compressed waste fluid to mixer 30. Mixer 30 prepares a waste fluid and air combustion mixture, which mixture is then fed from outlet 28 of mixer 30 to combustor 22 where this mixture is mixed with the fuel fed to combustor 22 from fuel source 24. Flow controls 50 and 52 may be throttle valves that are mechanically controlled to change the cross-sectional area for the flow, or electromagnetic or hydraulic valves that move so as to vary the amount of flow.

First flow control 50 is connected to a first control member 54, which imparts a first movement I to first flow control 50. Second flow control 52 is connected to a second control member 56, which imparts a second movement II to second flow control 52. A control actuator with a pedal 58 acts upon the control members 54 and 56 in such a manner that the second movement II occurs in advance of the first movement I.

When the flow of air fed to mixer 30 increases with a respective increase in the quantity of fuel fed from fuel source 24 to combustor 22 under steady operation conditions, a corresponding waste fluid quantity must be removed from the flow duct. In order to do this, an outlet 60 for the waste fluid is provided between inlet 44 of compressor 10 and outlet 46 of compressor 10. Outlet 60 may open to the atmosphere, or outlet 60 may communicate with the atmosphere through a pressure booster 62.

The gas turbine engine in a typical application will have both a source of air under pressure 51, which is used for feeding air for combustion from the atmosphere to mixer 30, and a pressure booster 62 for removing the waste fluid from the flow duct at outlet 60. Both devices are needed. When the engine runs at low power (e.g., 25%–30% of full power), or when the engine is idling, the pressure downstream of compressor 10 is below the atmospheric pressure, and the pressure of the waste fluid has to be raised above atmospheric pressure in order to expel a part of the waste fluid into the atmosphere. In this engine operating mode, combustion air can enter mixer 30 at a pressure below atmospheric pressure, and source of air under pressure 51 is not needed. However, source of air under pressure 51 becomes necessary when the load on the engine increases, which requires more air and fuel to be fed to combustor 22. This results in increased waste fluid in the flow duct, and increased fluid density in the gas turbine engine, resulting in increased pressure. When the pressure in the engine becomes greater than the atmospheric pressure (at about 40% of full power), more air for combustion can be fed to mixer 30 and to combustor 22 only by raising the air pressure by using the source of air under pressure 51 (e.g., an air compressor).

It should be noted, however, that a gas turbine engine could be built for a specific application or operating mode such that the flow duct pressure would be either always below or always above the atmospheric pressure over the entire gas turbine engine operating range. In these cases, only a pressure booster 62 or only a source of air under pressure 51 need be used.

The gas turbine engine has a temperature sensor 64 for sensing the temperature of the waste fluid discharged from compressor turbine 18. Temperature sensor 64 is connected to a temperature control module 66 which controls the load (not shown) on an electric generator 68 that is coupled mechanically to compressor 10 (in this embodiment, the generator 68 is mounted on shaft 20 of compressor turbine 18, but can alternatively be coupled to this shaft through a gearbox). Temperature sensor 64, temperature control module 66, and electric generator 68 with its load (not shown) are used to keep constant the waste fluid temperature at outlet 26 of compressor turbine 18.

A fuel control module 70 controls fuel supplied by fuel source 24 to combustor 22. Fuel control module 70 receives a signal from an air flow sensor 72 installed at first inlet 32 of mixer 30 to meter the fuel from the fuel source 24 in accordance with the amount of air that goes to mixer 30 and then to combustor 22. Air flow sensor 72 and the fuel control module 70 are well known in the art of direct fuel injection motor vehicles and are not described herein in detail.

Figure 2:
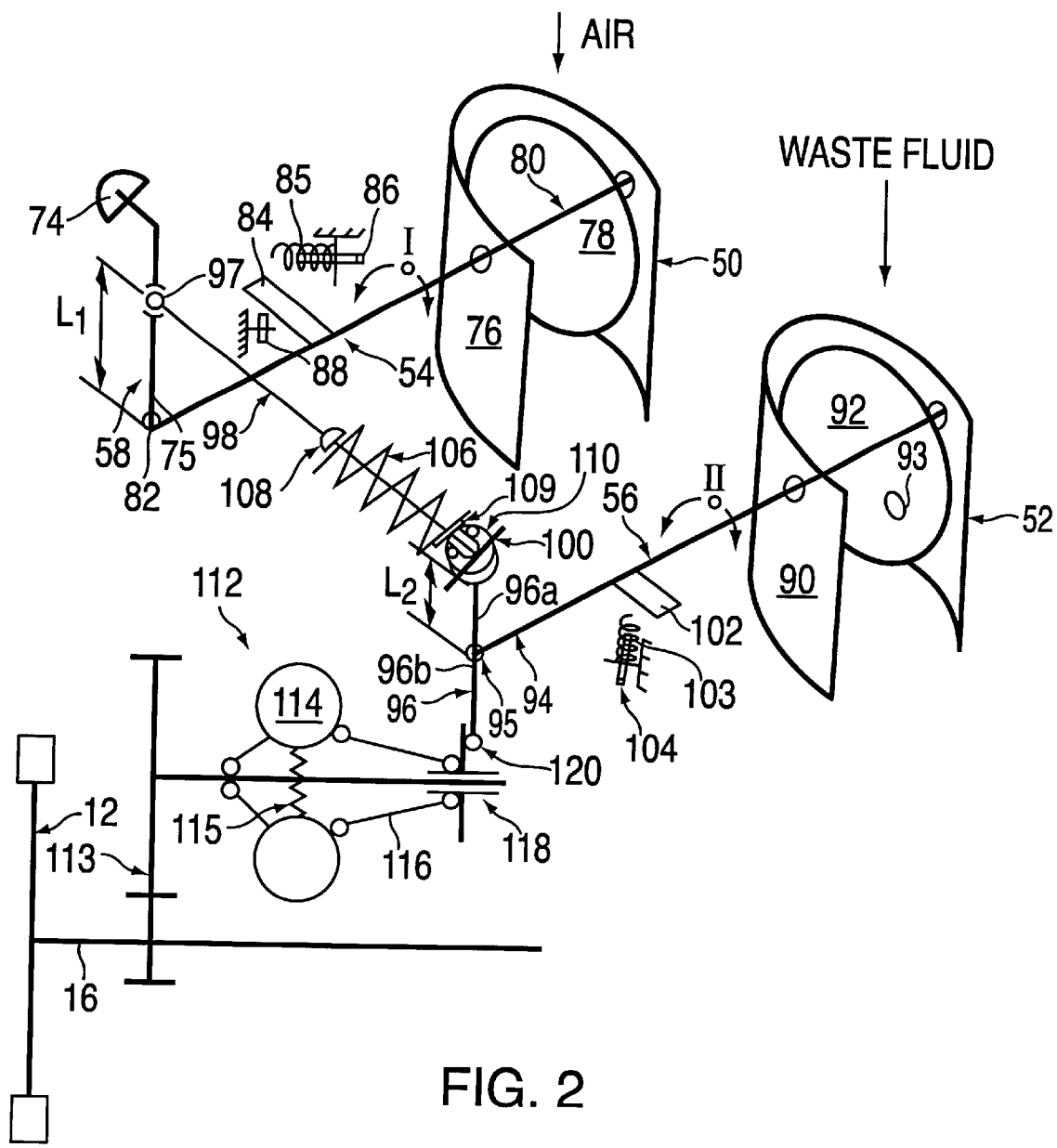
FIG. 2 is a schematic illustration of an embodiment of a control system for the gas turbine engine according to the invention.

FIG. 2 shows a more detailed schematic view of a control system that is used to control the mixing of waste fluid and combustion air in mixer 30 (FIG. 1). Similar parts are shown in FIG. 2 using the same reference numerals as in FIG. 1.

Control actuator 58 has a control such as a pedal 74 that is used to control gas turbine engine power (and speed) in the manner similar to a motor vehicle accelerator or gas pedal. The first flow control 50 has a flow duct 76, which connects first inlet 32 of mixer 30 to a source of air for combustion (the atmosphere or the source of air under pressure 51 in FIG. 1). A flow control valve such as a throttle valve 78 is installed in duct 76 to rotate on a shaft 80, which has its centerline extending in the diametrical plane of the cross-section of duct 76. Shaft 80 is part of an actuator for the flow control valve or throttle valve 78. Shaft 80 is connected to an arm 75 of pedal 74 at location 82 and has a lug 84 at the end which is engageable with stops 86 and 88 to limit the movement I of throttle valve 78 in both directions. Stop 88 determines the minimum opening amount of throttle valve 78 for no-load operation. Stop 86 determines the maximum opening amount of throttle valve 78. A return spring 85 installed between stop 86 and lug 84 is used to return throttle valve 78 to the initial position minimum opening when pedal 74 is released. The second flow control generally shown at 52 has a flow duct 90 which connects second outlet 40-2 of heat exchanger 36 to second inlet 34 of mixer 30 to meter the heated compressed waste fluid flow to mixer 30. A flow control valve such as a throttle valve 92 is installed in duct 90 for rotation on a shaft 94, which has its centerline extending in the diametrical plane of the cross-section of duct 90. Shaft 94 is part of an actuator for throttle valve 92. Shaft 94 is connected at location 95 to a double arm lever 96 having one arm 96a that has a pivot 100 at its distal end. A linkage 98 pivotally connected to arm 75 of pedal 74 at 97 extends through pivot 100.

Shaft 94 has a lug 102 which is engageable with a stop 104 for limiting the movement II of throttle valve 92. Stop 104 limits the maximum movement of throttle valve 92, and a return spring 103 is used to return throttle valve 92 to the initial position 10 when pedal 74 is released. A return spring 106 is installed on linkage 98. Return spring 106 is installed between a plate 108 secured to linkage 98, which may be a nut for adjustment (not shown) and a plate 109 that bears against pivot 100. A retaining ring 110 is installed at the free end of linkage 98 and bears against pivot 100 on the opposite side.

The length L1 of first arm 75 of pedal 74, which controls rotation of shaft 80, is more than twice as large as the length L2 of second arm 96a which control rotation of shaft 94. In a general case, the length L1 is greater than the length L2, and the ratio L1/L2 is determined by specific application of requirements for the gas turbine engine. With this arrangement, the movement II of throttle valve 92 which is used to control the flow of the waste fluid to mixer 30 (FIG. 1) will occur with anticipation of the movement I of throttle valve 78 which is used to control the flow of air for combustion to mixer 30. This means that when throttle valve 92 for the waste fluid is fully opened, throttle valve 78 for air for combustion will be only less than half-opened. The ratio of the lengths of arms 75 and 96a may be adjusted by any appropriate known means, e.g., by making the arms of two pieces with a threaded joint between the two pieces (not shown) to change the setpoint within the power range of the gas turbine engine until which throttle valve 92 for the waste fluid flow control will move to the fully open position. Throttle valve 92 has a permanent opening 93 which is used to provide a constant minimum flow of the waste fluid to mixer 30 and to combustor 22 when the throttle valve 92 is closed (during the starting, at no-load, or at the maximum fuel supply level and zero speed of the power turbine). This means that during the starting and idling of the engine, the ratio of air to the waste fluid will be approximately 1:1. The size of opening 93 is about 7% of the full-throttle area. The amount of the minimum flow through opening 93 depends on the engine starting requirements.

A speed sensor such as a centrifugal governor 112 may be installed on shaft 16 of power turbine 12 or coupled to shaft 16 through a gearing 113 as shown in FIG. 2. Centrifugal governor 112 is used to monitor the speed of power turbine 12. Centrifugal governor 112 has flyweights 114 with a return spring 115. Flyweights 114 have levers 116 engageable with a slider 118 which is connected to second arm 96b of double-arm lever 96 of shaft 94 that controls throttle valve 92 for the waste fluid control 52. Second arm 96b is connected to slider 118 by means of a pivot 120.

When the gas turbine engine is started, compressor 10 (powered by a starter which can be the same generator 68) creates a reduced pressure in combustor 22, and an igniter (not shown) is energized. When pedal 74 is pressed, throttle valve 78 is moved to the open position, and air is fed to mixer 30 and to combustor 22. Fuel is supplied to the combustor from the fuel source 24 in accordance with the quantity of air supplied for combustion. The fuel starts burning in combustor 22, and the heated fluid (combustion products), which is formed as a result of this burning, goes to power turbine 12 and to the compressor turbine 18. The waste fluid from the outlet of compressor turbine 26 moves through heat exchanger 36 (from first inlet 38-1 to first outlet 40-1 in FIG. 1) in which it is cooled, and the waste fluid is then admitted to the compressor 10 at inlet 44 to be compressed. The compressed waste fluid then goes to second outlet 40-2 of heat exchanger 36 and is heated by the waste fluid that goes from outlet 26 of compressor turbine 18. The waste fluid from second outlet 40-2 of heat exchanger 36 goes through the duct 90 (FIG. 2) and passes through the permanent opening 93 of throttle valve 92 for the waste fluid which is not yet opened because of the lost motion provided by compression of spring 106 on linkage 98. Slider 118 holds lever 96 stationary as power turbine 12 does not rotate, and flyweights 114 do not cause slider 118 to move. Shaft 94 cannot be turned as pivot 120 bears against stationary slider 118, whereby throttle valve 92 for the waste fluid remains closed.

After the engine has been started, power turbine 12 begins to rotate, and its speed increases. This speed increase results in flyweights 114 moving under the action of the centrifugal force and extending spring 115. This movement of flyweights 114 causes slider 118 to move to the left, and spring 106 to linkage 98 will push the pivot 100 through plate 109. Arm 96a of double-arm lever 96 will cause shaft 94 to turn and to start opening throttle valve 92 for the waste fluid. When power turbine 12 starts rotating, compressor turbine 18 receives less power, and waste fluid flow decreases, the waste fluid flow to mixer 30 will remain about the same as it was during the starting period (i.e., the air-to-waste fluid ratio will be about 1:1).

When pedal 74 is further depressed, shaft 80 will be turned further by arm 75 to move throttle valve 78 further open to supply more air to mixer 30 (which also causes an increase in the amount of fuel metered to combustor 22). Return spring 106 is compressed and pushes pivot 100 and arm 96a of double-arm lever 96 further to the right to turn shaft 94 to further increase the open throttle valve 92 for the waste fluid. As the speed of power turbine 12 increases, flyweights 114 of centrifugal governor 112 move apart and cause slider 118 to move to the left. Now lever 96 is free to move under the action of linkage 98. As the ratio of lengths of arm 75 and arm 96a (L2/L1) is about 1:2, throttle valve 92 for waste fluid will open at about twice the rate the throttle valve 78 for combustion air, consequently the air flow/waste fluid flow ratio will change from about 1:1 at the beginning of the acceleration period to about 1:1.2 when the engine gains full speed. The air flow/waste fluid flow ratio changes only 20% instead of 50% (which would correspond to the 1:2 ratio of L2 to L1) because in engine operation of the engine in the nominal power range, the compressor delivers a lower quantity of waste fluid.

When the gas turbine engine load increases to such an extent that the speed of power turbine 12 decreases, and the full power of the fluid flow goes to compressor turbine 18 to increase its power so that compressor 10 starts working harder, waste fluid flow increases. This results in the heated fluid decreasing temperature at the outlet from combustor 22, and consequently the temperature of the waste fluid at outlet 26 of compressor turbine 18 tends to decrease. This temperature decrease goes from the temperature sensor 64 senses and signals this temperature decrease and signals temperature control module 66, which increases the load on electric generator 68 (which is installed on the shaft 20 of the compressor turbine 18), and compressor 10 will supply less waste fluid. At the same time, the waste fluid quantity from compressor 10 will be still greater than the quantity needed for normal combustion. While this all takes place, the speed of power turbine 12 decreases, spring 115 will compress and move flyweights 114 of centrifugal governor 112 back toward their at rest position, and slider 118 will move to the right to turn throttle valve 92 through shaft 94 to reduce the waste fluid going to mixer 30. These actions will restore the balance between the amount of combustion air, fuel and waste fluid admitted to combustor 22.

During the gas operation turbine engine, a part of the waste fluid is removed from the flow duct by discharging it from outlet 60 between inlet 44 and outlet 46. This removal is necessary to replace a part of the waste fluid with combustion air in order to sustain combustion in combustor 22. When the pressure at outlet 60 is equal to or below the atmospheric pressure (which occurs at up to 30% of rated power), waste fluid removal is carried out by a pressure booster 62 (e.g., a compressor). This pressure booster may be activated by using a pressure switch (not shown) when the pressure in the flow duct is below atmospheric pressure. The pressure booster may be turned (by any appropriate known devices such as a pressure switch which is not shown) when the pressure in the flow duct becomes greater than the atmospheric pressure. Source of air under pressure 51 is used when the pressure in the flow duct is equal to or above atmospheric pressure (i.e., when the power is above 30% of rated power) to allow combustion air which is below atmospheric pressure, to enter the gas turbine engine flow duct, which is at a pressure that is above atmospheric pressure. When the pressure in the flow duct decreases below the atmospheric pressure, source of air under pressure 51 may be turned (e.g., by means of a pressure switch that is not shown), and combustion air will be supplied to mixer 30 by suction while the pressure in the flow duct remains below atmospheric pressure. Preferably, waste fluid is removed between the inlet and outlet of compressor 10. The waste fluid may also be removed outside compressor 10 upstream of the second inlet 38-2 of the heat exchanger.

The gas turbine engine according to the invention has a new and improved control system which ensures an optimum composition of the mixture of combustion air and waste fluid, for the entire range of engine load conditions. The control system prevents the engine from stalling when the power turbine speed suddenly drops. The efficiency of the gas turbine engine is also improved because the waste fluid is removed between the inlet and outlet of the compressor without being heated in the heat exchanger.

Various modifications and additions may be made to the embodiments described above without going beyond the spirit and scope of the present invention as defined in the claims, set forth herein. Thus the heat exchanger may have an additional cooling stage for cooling the waste fluid that goes to the compressor. The gas turbine engine may have a special device for heating fuel before feeding it to the combustor. The mechanical control system that uses the throttle valves to control the flows as described above may be replaced with an electric or hydraulic control system with the use of solenoid valves or hydraulically actuated valves for controlling the flows of air for combustion and waste fluid. The centrifugal governor which is used to limit the movement of the throttle valve and to prevent the engine from stalling as described above may be replaced with an electric control system including a power turbine speed sensor and a control module activating a solenoid control member cooperating with the throttle valve.

I claim:

1. A method of operating a gas turbine engine having a fluid compressor, a power turbine mounted downstream of said fluid compressor, a fluid compressor turbine for driving said fluid compressor, said fluid compressor turbine mounted downstream of said power turbine rotating in a direction opposite to the direction of said power turbine, a heated fluid source provided upstream of said power turbine, and a fuel source connected to said heated fluid source, said method comprising:

a) burning said fuel with combustion air to obtain heated fluid and feeding said heated fluid to said power turbine and to said fluid compressor turbine, whereby a waste fluid flow is obtained downstream of said fluid compressor turbine;

b) feeding said waste fluid flow that is obtained downstream of said fluid compressor turbine to a heat exchanger for cooling;

c) compressing said cooled waste fluid flow in said fluid compressor to obtain a compressed waste fluid flow;

d) feeding said compressed waste fluid flow to said heat exchanger for heating using the heat of said waste fluid flow that is obtained downstream of said fluid compressor turbine to obtain a heated compressed waste fluid flow;

e) feeding said heated compressed waste fluid flow and combustion air flow for mixing said heated compressed waste fluid flow with said combustion air flow;

f) feeding said mixture of said heated compressed waste fluid flow and said combustion air to said heated fluid source for mixing with said fuel;

g) removing a partial flow of said cooled waste fluid flow upstream of said heat exchanger into the atmosphere;

h) controlling said combustion air flow;

i) controlling said fuel source in relation to said controlling of said flow of combustion air flow;

j) controlling said heated compressed waste fluid flow before feeding said heated compressed waste fluid flow to prepare said mixture of said heated compressed waste fluid flow with said combustion air.

2. The method of claim 1, wherein said flow of said heated compressed waste fluid is reduced when the speed of said power turbine decreases.

3. A gas turbine engine comprising:

a fluid compressor, said fluid compressor having an inlet and an outlet;

a power turbine, said power turbine being mounted downstream of said fluid compressor;

a fluid compressor turbine for powering said fluid compressor, said fluid compressor turbine being mounted downstream of said power turbine for rotation in a direction opposite to the rotation direction of said power turbine, said fluid compressor turbine having an outlet for discharging waste fluid, said waste fluid having a temperature;

a heat exchanger having at least two inlets and at least two outlets;

a heated fluid source provided upstream of said power turbine;

a fuel source connected to said heated fluid source;

a source of air under pressure for providing combustion air;

a first inlet of said at least two inlets of said heat exchanger being connected to said outlet of said fluid compressor turbine;

a second inlet of said at least two inlets of said heat exchanger being connected to said outlet of said fluid compressor;

a mixer for preparing a mixture of said waste fluid and said combustion air, said mixer having an outlet connected to said heated fluid source and two inlets;

a first inlet of said two inlets of said mixer being connected to said source of air under pressure;

a second inlet of said at least two inlets of said mixer being connected to said second outlet of said heat exchanger;

an outlet for said waste fluid provided between said inlet of said fluid compressor and said outlet of said fluid compressor, said outlet for said waste fluid communicating with the atmosphere;

a means for controlling said temperature of said waste fluid;

a first flow control means, said first flow control means being provided between said source of air under pressure and said mixer;

a second flow control means, said second flow control means being provided between said second outlet of said heat exchanger and said mixer.

4. The gas turbine engine of claim 3, wherein said gas turbine engine has a first control member and a second control member, said first flow control means being connected to said first control member, which imparts a first movement to said first flow control means, and said second control member being connected to said second control means, which imparts a second movement to said second flow control means, said second movement occurring in advance of said first movement.

5. The gas turbine engine of claim 3, wherein said gas turbine engine has a limiting means and a means for monitoring the speed of said power turbine, said limiting means being connected to said means for monitoring the speed of said power turbine and to said second control member to limit said second movement.

6. The gas turbine engine of claim 3 wherein said gas turbine engine has:

a first actuator for said first flow control valve, said first actuator comprising a control and a first arm having a length and connected to said control; and a second actuator for said second flow control valve, said second actuator comprising a second arm having a length, second arm being coupled to said control;

said length of said first arm being greater than said length of said second arm.

7. The gas turbine engine of claim 6, said gas turbine engine further comprising:

a speed sensor coupled to said power turbine for sensing the speed of said power turbine;

a movable limiting actuator member coupled to said speed sensor, the position of said movable limiting actuator member depending on the speed of said power turbine;

said movable actuator member being engageable with said second actuator.

8. The gas turbine engine of claim 7, wherein said speed sensor comprises a centrifrugal governor and said movable actuator member comprises a slider, said second actuator having an auxiliary arm which is engageable with said slider.

9. The gas turbine engine of claim 8, wherein said speed sensor comprises a centrifrugal governor and said movable actuator member comprises a slider, said second actuator having an auxiliary arm which is engageable with said slider.

10. The gas turbine engine of claim 6, wherein at least one of said flow control valves comprises a throttle valve.

11. The gas turbine engine of claim 10, wherein said at least one throttle valve is coupled to said second arm and has a permanent opening.

12. The gas turbine engine of claim 11, wherein said speed sensor comprises a centrifrugal governor and said movable actuator member comprises a slider, said second actuator having an auxiliary arm which is engageable with said slider.

13. A gas turbine engine comprising:
- a fluid compressor, said fluid compressor having an inlet and an outlet;
- a power turbine, said power turbine being mounted downstream of said fluid compressor;
- a fluid compressor turbine for powering said fluid compressor, said fluid compressor turbine being mounted downstream of said power turbine for rotation in a direction opposite to the rotation direction of said power turbine, said fluid compressor turbine having an outlet for discharging waste fluid, said waste fluid having a temperature;
- a heat exchanger having at least two inlets and at least two outlets;
- a heated fluid source provided upstream of said power turbine;
- a fuel source connected to said heated fluid source;
- a first inlet of said at least two inlets of said heat exchanger being connected to said outlet of said fluid compressor turbine;
- a second inlet of said at least two inlets of said heat exchanger being connected to said outlet of said fluid compressor;
- a mixer for preparing a mixture of said waste fluid and air for combustion air, said mixer having an outlet connected to said heated fluid source and two inlets;
- a first inlet of said two inlets of said mixer communicating with the atmosphere;
- a second inlet of said at least two inlets of said mixer being connected to said second outlet of said heat exchanger;
- an outlet for said waste fluid provided between said inlet of said fluid compressor and said outlet of said fluid compressor;
- a pressure booster having an inlet and an outlet, said inlet of said pressure booster being connected to said outlet for said waste fluid and said outlet of said pressure booster communicating with the atmosphere;
- a means for controlling said temperature of said waste fluid;
- a first flow control means, said first flow control means being provided between said source of air under pressure and said mixer;
- a second flow control means, said second flow control means being provided between said second outlet of said heat exchanger and said mixer.

14. The gas turbine engine of claim 13, wherein said gas turbine engine has a first control member and a second control member, said first flow control means being connected to said first control member, which imparts a first movement to said first flow control means and said second control means being connected to said second control member, which imparts a second movement to said second flow control means, said second movement occurring in advance of said first movement.

15. The gas turbine engine of claim 13, wherein said gas turbine engine has a limiting means and a means for monitoring the speed of said power turbine, said limiting means being connected to said means for monitoring the speed of said power turbine and to said second flow control means to limit said second movement.

16. The gas turbine engine of claim 13 wherein said gas turbine engine has:
- a first actuator for said first flow control valve, said first actuator comprising a control and a first arm having a length and connected to said control; and
- a second actuator for said second flow control valve, said second actuator comprising a second arm having a length, second arm being coupled to said control;
- said length of said first arm being greater than said length of said second arm.

17. The gas turbine engine of claim 16, said gas turbine engine further comprising:
- a speed sensor coupled to said power turbine for sensing the speed of said power turbine,
- a movable limiting actuator member coupled to said speed sensor, the position of said movable limiting actuator member depending on the speed of said power turbine;
- said movable actuator member being engageable with said second actuator.

18. The gas turbine engine of claim 17, wherein said speed sensor comprises a centrifrugal governor and said movable actuator member comprises a slider, said second actuator having an auxiliary arm which is engageable with said slider.

19. The gas turbine engine of claim 16, wherein at least one of said flow control valves comprises a throttle valve.

20. The gas turbine engine of claim 19, wherein said speed sensor comprises a centrifrugal governor and said movable actuator member comprises a slider, said second actuator having an auxiliary arm which is engageable with said slider.

21. The gas turbine engine of claim 19, wherein said at least one throttle valve is coupled to said second arm and has a permanent opening.

22. The gas turbine engine of claim 21, wherein said speed sensor comprises a centrifrugal governor and said movable actuator member comprises a slider, said second actuator having an auxiliary arm which is engageable with said slider.

* * * * *